(12) United States Patent
Melberg et al.

(10) Patent No.: US 7,547,077 B2
(45) Date of Patent: Jun. 16, 2009

(54) WHEEL AND OTHER BEARING HUBS SAFETY RESTRAINT DEVICES, LOCKS AND VISUAL WARNING INDICATORS

(76) Inventors: Nels Melberg, 20477 Bald Peak Rd., Newberg, OR (US) 97132; John M. Ekman, 6420 Mineral Springs Rd. NE., Carlton, OR (US) 97111

(*) Notice: Subject to any disclaimer, the term of this patent is extended or adjusted under 35 U.S.C. 154(b) by 0 days.

(21) Appl. No.: 11/687,486

(22) Filed: Mar. 16, 2007

(65) Prior Publication Data
US 2007/0215032 A1 Sep. 20, 2007

Related U.S. Application Data

(60) Provisional application No. 60/784,191, filed on Mar. 20, 2006.

(51) Int. Cl.
*B60B 27/00* (2006.01)
*G01K 1/02* (2006.01)
*F01M 1/18* (2006.01)
*F16C 25/00* (2006.01)

(52) U.S. Cl. ............... 301/108.1; 184/6.4; 384/624; 116/216

(58) Field of Classification Search ............ 301/105.1, 301/108.1–108.4, 114–115, 122, 111.03, 301/131–132; 116/217–218
See application file for complete search history.

(56) References Cited

U.S. PATENT DOCUMENTS

| 483,975 A | 10/1892 | Beach |
| 802,611 A | 10/1905 | Van Horn |
| 1,361,000 A | 12/1920 | Blain |
| 2,280,755 A * | 4/1942 | Hexamer ............... 116/214 |
| 4,811,992 A | 3/1989 | Steiner |
| 5,560,687 A | 10/1996 | Hagelthorn |
| 5,658,053 A | 8/1997 | Vencill |
| 5,954,151 A | 9/1999 | Cochrane et al. |
| 6,203,114 B1 | 3/2001 | Ehrlich |
| 6,263,996 B1 | 7/2001 | Welch |
| 6,546,892 B2 | 4/2003 | Kelly, Jr. |
| 6,759,963 B2 * | 7/2004 | Hayes ............... 340/584 |
| 6,776,261 B2 * | 8/2004 | Eriksen et al. ........... 184/6.4 |
| 7,000,995 B2 | 2/2006 | Hanelthorn |

* cited by examiner

*Primary Examiner*—Jason R Bellinger
(74) *Attorney, Agent, or Firm*—Dowell & Dowell, P.C.

(57) ABSTRACT

Wheel and other bearing restraint jam nuts and early warning visual warning indicators for use with bearing hubs including driven and non-driven wheel bearing hubs wherein each jam nut is adapted to be received on either a threaded drive axle tube spindle or an axle spindle by use of a convention tool and such that the jam nut is of a size to obstruct wheel bearing hub separation in the event of a bearing failure and wherein a portion of the jam nut is engageable to force an indicator outwardly of the wheel bearing hub whenever the wheel bearing hub is not properly rotating about it's axis of rotation to thereby provide a visual indication of a potential problem with the bearings or other components within the wheel or other bearing hub.

23 Claims, 11 Drawing Sheets

FIG. 15
FIG. 16
FIG. 17
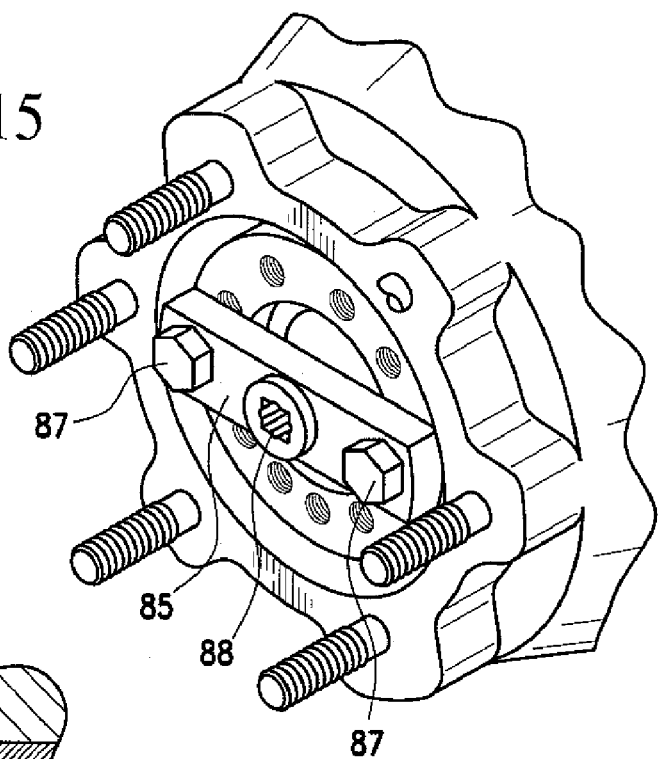
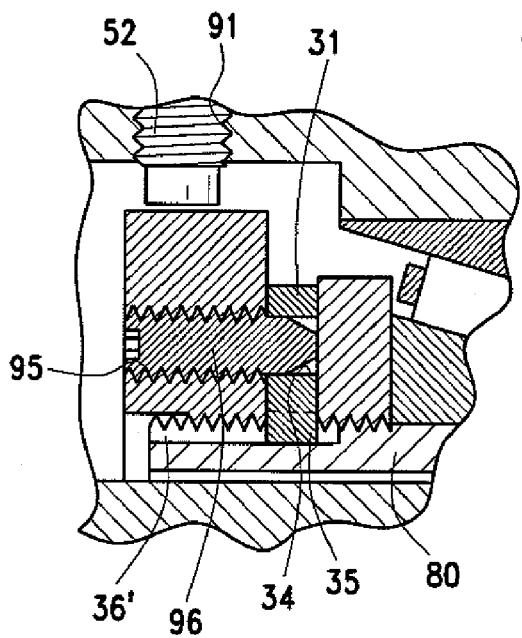
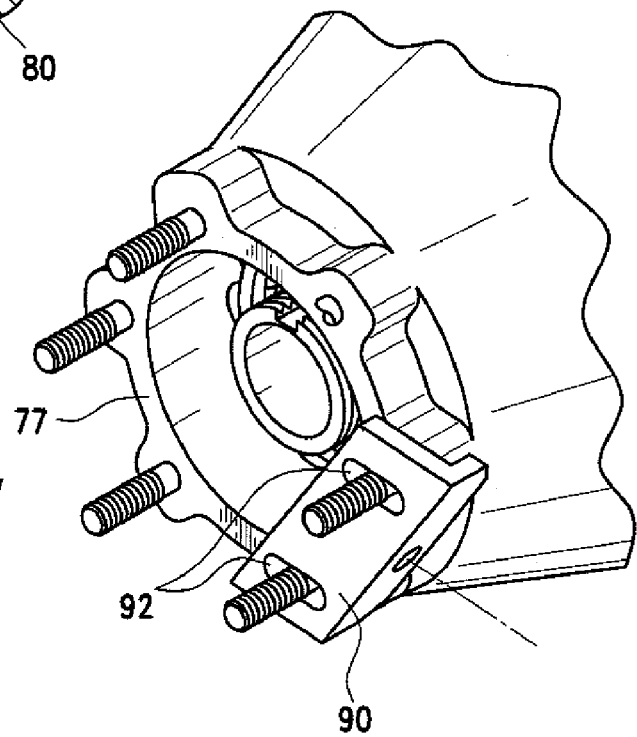

WHEEL AND OTHER BEARING HUBS SAFETY RESTRAINT DEVICES, LOCKS AND VISUAL WARNING INDICATORS

CROSS REFERENCE TO RELATED APPLICATIONS

This application is a non-provisional application claiming the benefit of U.S. provisional application Ser. No. 60/784,191, filed Mar. 20, 2006, in the name of Nels Melberg, entitled, Hub Lock Visual Indicator and Safety Restraint System and Apparatus, the entire contents of which are incorporated herein by reference.

BACKGROUND OF THE INVENTION

1. Field of the Invention

The present invention is generally directed to the field bearing hubs and support bearings for supporting rotating machinery or members and, in preferred embodiments to wheel bearing hubs and axle assemblies used on vehicles including all types of automobiles, trucks, trailers, aircraft, farm equipment and the like. The teachings of the invention also are applicable to other environments such as industrial machinery and the like. More particularly, the invention is directed to visual emergency warning indicators which reflect when bearings have become loose or the bearings and related components have become dangerously worn which could result damage to equipment, machinery and vehicles. With vehicles, such wear or failure can result in wheel bearing hub, axle or axle spindle damage that may cause the wheel bearing hub, brake drum, wheel(s) and tire(s) to separate from the vehicles. In some embodiments of the invention, the visual emergency warning indicators may also provide a visual indication of excessive heat build up within a wheel or other bearing hub that could result in bearing damage and hub mounting failure that could also result in damage, and in vehicles, to possible wheel separation.

The invention is also directed to providing enlarged high strength steel early warning jam nuts that can be easily installed using conventional tools and which, should the wheel or other hub bearings begin to fail, can prevent wheel assembly, or other component, separation for a period of time to allow corrective action to be taken. The invention also provides locks for the early warning jam nuts to prevent accidental loosening of the jam nuts.

2. Brief Description of the Related Art

A particular problem associated with substantially any type of vehicle that has wheels mounted on bearings, including commercial and non commercial vehicles is a sudden and unexpected separation of one or more wheel assemblies from a non driven axle spindle or driven axle drive tube spindle to which they are mounted. Such separations are brought about by bearing failures, hub failures and bearing hub assembly retaining failures. Such failures may be caused by many problems including bearing assembly wear, lack of lubrication and loosening of jam or lock nuts used to secure the bearing assemblies in safe operative condition. When a failure of an outer bearing assembly occurs, the bearings can destroy the integrity of the lock and jam nuts such that it is possible that the wheel hub can thereby become separated from the axle spindle or drive tube spindle. The separation of a wheel bearing hub from a vehicle traveling at any speed creates a potentially catastrophic situation. Considering that an average two wheel bearing hub includes two rims, two tires and a brake drum that can have a combined weight of 400 or more pounds, if a wheel bearing hub of a truck separates at a speed of 55 mph or greater, not only is there probable loss of vehicle control that can result in possible injury or death, but the wheel assembly itself can become a damaging or lethal projectile as it careens into oncoming or other vehicular traffic or into pedestrians. Such possible tragedies are caused not only by the inherent conventional wheel bearing hub designs, and/or mounting techniques, which are in conventional use, but also due to poor or improper maintenance.

Currently, it is virtually impossible for a driver or federal or state Department of Transportation inspector to inspect wheel bearings and locking mechanisms unless the wheel bearing hub cover is removed or the drive axle is removed. Prior to removal of these components, the lubricant must be removed from the bearing cavity and collected. Such a practice is usually not performed during motor vehicle inspections, nor is rarely performed by drivers or operators. As a practical matter, many wheel, or other machinery, bearing hubs are not checked or inspected until vehicle or equipment maintenance is required and then, all too often, these areas can be overlooked unless extensive maintenance is performed such as changing brake components, leaky seals or the like.

With reference to FIGS. 1 and 2, a wheel bearing hub 10 is shown as conventionally mounted to freely rotate about a spindle 11 of a non-driven axle 12, such as one associated with a commercial trailer. The spindle includes a threaded end portion 13. The hub is seated about a bearing assembly that includes inner tapered roller bearings 14 and outer tapered roller bearings 16. The hub includes an inner cavity or bearing housing 17 that forms a lubricant reservoir to retain oil that fills the lower portion of the cavity to a level below a removable plug 18 that normally seals an opening 19 of a wheel bearing hub cover 20. The wheel bearing hub cover seals the cavity using a gasket, not shown, and the cover is secured using bolts 21 that pass through openings in an outer flange 22 of the hub 10 and are threaded into threaded openings 23 in an outer face 24 of the hub. The inner and outer tapered bearings 14 and 16 are seated between inner and outer tapered bearing journals 25 and 26 and 27 and 28, respectively. The bearing assembly is sealed opposite the wheel hub cover by an inner oil seal 29.

The inner and outer bearings 14 and 16 are designed to be retained in place on the spindle by a combination of an inner nut 30, a lock washer 31 and a locknut or jam nut 32. During assembly, a wrench is used to thread the inner nut 30 on the threaded end 13 of the spindle 12. Thereafter, lock washer 31 is placed over the end of the spindle. To prevent the nut from loosening, the nut may include a tab or nubbin 33 that cooperatively seats within one of a plurality of holes 34 that are provided in spaced relationship about the body of the lock washer 31. The washer may also include a locking tab 35 that extends inwardly thereof that is cooperatively seated within a channel or keyway 36 formed or machined in the threaded end portion 13 of the spindle 11. With the lock washer in place, the jam nut 32 is threaded to the threaded end portion of the spindle and tightened to retain the bearing assembly in place.

Conventional designs for wheel bearing hubs and axle spindles or drive tube spindles rely solely on the integrity of the outer bearings and current locking methods to maintain the wheel bearing hubs in proper position on the spindles and to prevent failures resulting in wheel separation. Should the outer bearings fail or the jam nuts used to retain the wheel bearing hubs on the bearings fail, there is no provision for preventing separation of the wheel bearing hub assembly. If a total failure of the outer bearing occurs, the locking components including the inner nut 30, the lock washer 31 and the jam nut 32 are small enough in size and diameter relative to the diameter of the hub bearing housing that the hub can wobble over or "walks" over the locking members and become completely separated from the spindle. In addition, the size and thickness of current jam nuts is such as to make it difficult to tighten or remove the jam nuts. Conventional jam nuts are formed of steel of no more than ¼" in thickness and are varied in size. Because of this, special tools are required in a variety of sizes, and if not available, mechanics can damage the jam nuts using improper tools, such as a hammer and chisel, which can damage and lead to failure of the jam nuts.

There is no provision in the prior art of providing an instant visual warning that there is damage within the wheel bearing hub causing the wheel bearing hub to oscillate, wobble or not rotate as it should which suggests that the bearings may be worn or damaged or that the locking components are no longer applying sufficient force to retain the bearings in place. As there is no early warning, it is not possible for a driver or operator to know that corrective action must be taken to prevent further damage and accidental wheel separation.

In addition to the foregoing and especially along the left side of a vehicle where the rotational direction of the wheels in a forward direction is counterclockwise, the locknuts, which are applied in a clockwise direction, can become loose. If there is any loosening of a locknut, a wobble and/or oscillation will develop between the wheel bearing hub and the spindle that will result in damage to and possible destruction of the bearings and/or bearing hub locking members resulting in wheel assembly separation.

A further problem associated with conventional wheel and other bearing hub assemblies is the monitoring of lubricant level. In some prior art structure, the driver or mechanic must remove a rubber plug and judge the lubricant level by touch or by inserting a gauge device, stick, screwdriver or the like. As the plugs are retained in place by friction fit, they will often leak and become messy. In the prior art structure shown in FIGS. 1 and 2, to provide a more user friendly manner of determining correct lubricant levels, the outer face 37 of the cover is formed of a transparent plastic material so that a visual check can be made of the lubricant level. Unfortunately, the plastic becomes discolored by the lubricant in a very short period of time making visual inspection very difficult.

In view of the foregoing, there remains a need to provide for added safety in the field of the design and construction of vehicle wheel bearing hubs and other bearing hub and bearing housings and bearing assemblies, that will provide drivers, transportation officials, safety inspectors or other observers and operators an early indication that a problem exists in a bearing hub or that conditions therein are indicative of a possible failure that requires immediate attention in order to protect operators, drivers, passengers, pedestrians and property from harm, injury or death.

There is also a need to provide a system for securing wheel bearing hubs to spindles or drive tube spindles in such a manner that it is not necessary to maintain numerous specialized tools on hand and such that conventional tools may be used and wherein it is not possible for wheel bearing hubs to simply grind down and wobble over the locking components thereby resulting in wheel bearing hub separation from spindles or drive tube spindles associated with the vehicle axles.

SUMMARY OF THE INVENTION

Embodiments of the present invention provide positive restraint or early warning jam nuts and early warning indicators that provide an insight into the internal condition of bearing hubs or housings which will help vehicle and other machinery operators and maintenance personnel to become aware of excessive bearing wear or failure or excessive play such as caused by lock or jam nuts loosening. The embodiments also function to restrain wheel bearing hubs on axles to help prevent the sudden and possible catastrophic loss of a wheel assembly from a vehicle.

The various embodiments will provide an early warning detection feature that provides a primary visual indication that a problem has developed within a wheel bearing hub, which a driver, operator, inspector or other person may see without invasive analysis, that is, without draining the lubricant from the hub or housing and/or disassembling the bearing hub assembly. In one embodiment, a pop-out style indicator will provide a warning to a driver, operator or other person of bearing wear or excessive end-play caused by jam or locknuts becoming loose or damaged. This should cause an investigation to be made and corrective action to be taken to prevent further damage and the possible sudden loss of a wheel assembly when a vehicle is being driven.

In a first embodiment of the invention, the conventional locknut or jam nut is replaced with a safety locknut or early warning jam nut that is larger and more massive than prior art structures, having a greater diameter and thickness. The outer wall of the early warning jam nut is preferably smooth and round such that an inner end of a warning indicator may be positioned proximate to or against the outer wall. The warning device is mounted through a seal in a side wall of a wheel bearing hub. Should the wheel bearing hub begin to oscillate or wobble as it rotates, the early warning jam nut will engage the indicator and force it outside of the wheel bearing hub to provide a visual indication of a problem.

In a second embodiment for use with non-driven wheel hub assemblies, a new wheel bearing hub cover is provided through which a housing of a warning device or indicator is mounted. The hub cover is provided with an easily removable access plug that permits easy access into the area of the bearings. The indicator is slidably mounted within the housing and has an inner end positioned proximate to or engaging an outer surface of the heavy duty safety locknut or early warning jam nut. The early warning jam nut of this embodiment has a different structure than the jam nut of the first embodiment. In this embodiment, the early warning jam nut is in a form of a hat-like structure having a central dome portion having a tool receiving opening or socket centrally thereof in which an end of a conventional ratchet tool may be seated so as to torque the early warning jam nut relative to a threaded spindle of a non-driven axle. The dome forms an inner chamber that is at least partially threaded to cooperatively engage the threads on the axle spindle. A flanged base of the early warning jam nut extends outwardly to a diameter that is generally equal to or greater than the diameter of the outer bore of the bearing cavity such that, in the event of bearing failure, the jam nut blocks the outer bearings and prevents the immediate loss of the wheel bearing hub from the axle. As the inner end of the indicator is proximate the outer surface of the flange, should any wobble develop in the movement of the wheel bearing hub, the indicator will be forced outwardly of the wheel bearing hub to give a visual indication of a problem. With this structure, an operator, maintenance person or safety inspector may easily check the tightness of a jam nut by simply inserting a ratchet tool through the opening in the hub cover and into the socket of the domed jam nut.

The warning device may include both an improper rotary motion indicator and a temperature indicator. In a preferred form of warning device, the temperature indicator may be mounted within the motion indicator such that it "pops out" of the motion indicator and is visually apparent outside of the wheel bearing hub should the temperature within the bearing cavity exceed a predetermined temperature.

As a special back-up safety feature and as set forth above, the early warning jam nuts will function to help retain wheel bearing hubs on their related axle spindles in the event of an outer bearing failure for a period of time. Various embodiments of the invention function as physical restraints at the wheel bearing hub to prevent sudden, unexpected wheel bearing hub, brake drum and tire assembly loss. Because the early warning jam nuts have outer circumferences substantially equal to or larger than the outer bore of the bearing hub cavities of the wheel bearing hub, they force the outer bearings of the wheel bearing hubs to fight their way to be released from the axle spindles. The interference created will allow more time and vibration so impending failure can be observed or felt by a driver or other person in time to take corrective action. In such embodiments, the early warning jam nuts will be beneficial in the event the visual indicator is not seen or fails, or a sudden failure occurs. The early warning jam nuts will provide some time to stop a vehicle when a failure occurs and thereby help prevent a potentially catastrophic accident.

In a variation of the early warning jam nuts of the invention, the jam nuts are provided with a plurality of tapped holes that are spaced relative to one another about a peripheral flange thereof so that no matter what the rotational alignment of the jam nuts have relative to a lock washer, one of the tapped holes will be aligned with an opening in the washer In this manner, a hard steel set screw may be threaded into the aligned hole and opening such that the set screw extends into the opening in the washer thus locking the early warning jam nuts to the washer and thus the axle spindle. In this manner, the early warning jam nuts cannot be accidentally loosened by rotational force.

In a third embodiment of the invention, the same visual indicator(s) or warning device(s) described above are used with wheel bearing hubs mounted to driven or drive axles wherein the devices are mounted directly through the wheel bearing hub spaced slightly inwardly of the conventional wheel bearing hub cover or axle cap. The warning devices may include both a pop-out or other equivalent temperature sensor and a pop-out motion or oscillation sensor responsive to undesired rotational movement of the wheel bearing hub relative to the bearing assembly or drive tube spindle. The motion sensor includes an inner end that generally tracks along an outer edge of another early warning jam nut used in accordance with the invention. In this embodiment, the drive axle shaft associated with the wheel bearing hub cover must pass through the early warning jam nut to be drivingly engaged so that, unlike the previous embodiment, there is no end cap or dome feature on the early warning jam nut that can be used to reinforce the jam nut and provide the socket for an adjusting or tightening tool. Instead, for adjusting and tightening purposes, a bar adapter having at least one tool receiving socket therein is secured to an annular body of the early warning jam nut. After the jam nut is secured, the bar adapter tool is removed to permit assembly of the drive axle.

The early warning jam nut of this embodiment may also have the plurality of spaced openings for permitting a set screw to be used to lock the jam nut relative to a lock washer and thus the drive tube spindle. This is very important especially considering situations where the early warning jam nuts have right hand threads on wheel bearing hub assemblies having right hand threads because with driven wheel bearing hubs, as a vehicle is moving forward at high speeds, the wheel bearing hubs, and thus the safety jam nuts that are mounted on the left side of a vehicle, are being rotated in a direction that is opposite to the tightening direction of the jam nuts. Thus, there is a constant force to loosen the early warning jam nuts. The set screws provide locks to help ensure that the early warning jam nuts can not rotate relative to the lock washers and thus help prevents the accidental loosening of the jam nuts.

It is a primary object of the invention to provide a visual warning device or indicator that is used in conjunction with an early warning jam nut system for retaining wheel bearing hubs on their wheel hub bearings of both driven and non driven axles which warning device provides an easily recognizable indication that a problem, such as wobbling or oscillations, has developed within the wheel bearing hub. Such an indication should alert a driver or other person to the fact that conditions within the wheel bearing hub are such that could lead to damage and potential wheel bearing hub, brake assembly and tire separation could occur. Once the driver, maintenance individual or safety inspector becomes aware of the potential problem, they can ensure that immediate action is taken to correct the problem. In this manner, it is possible to help prevent accidental loss or damage to property and injury or death to people.

It is also an object of the invention to provide a visual warning device or indicator that is used in conjunction with an early warning jam nut system for retaining wheel bearing hubs on wheel hub bearings of both driven and non-driven wheels which warning device provides a visual indication that a problem has developed within the wheel bearing hub that could lead to damage and potential wheel separation that includes a first warning when there is excessive heat sensed with the wheel bearing hub, housing or cavity and a second warning indicating that there is adverse movement of the wheel bearing hub, such as wobbling, so that corrective active may be taken before wheel bearing assembly including brake drum, wheel(s) and tire(s) separation occurs.

It is a further object of the invention to provide an early warning jam nut system for securing wheel bearing hub assemblies in place that will also provide a measure of protection against wheel bearing hub assembly separation from a spindle of a non-driven or driven axle by providing a jam nuts constructed of high strength steel that have both a greater mass and larger diameter such that they will block and temporarily retain wheel hubs in place even if complete bearing failure should occur, for at least a sufficient period of time that a vehicle or equipment operator will be able to take action to control the vehicle to prevent any harm or injury.

It is another object of the invention to provide a jam nut system for wheel bearing hubs mounted on axle spindles wherein the jam nuts can be easily tightened using conventional ratchet tools and ratchet tool assemblies such that specialized and difficult to use tools are not required for repair and maintenance.

It is another object of the invention to provide a visual warning device or indicator that may be used in conjunction with an early warning jam nut system for retaining wheel bearing hubs on the wheel hub bearings wherein either or both the warning device and/or the jam nut system may be installed as factory new equipment or easily and quickly used to retrofit existing wheel bearing hub mountings.

It is an additional object of the invention to provide a visual warning device or indicator that is used in conjunction with an early warning jam nut system for helping to retain wheel bearing hubs on their axles that includes a secondary lock for the jam nuts to help prevent possible loosening of the jam nuts during normal vehicle use.

BRIEF DESCRIPTION OF THE DRAWINGS

A better understanding of the invention will be had with reference to the accompanying drawings wherein:

FIG. 15 is a perspective view showing a tool bar used to loosen or tighten the jam nut of the third embodiment of the invention;

FIG. 16 is a perspective view showing the manner in which the jam nut of the third embodiment is locked to the adjacent washer and thus the drive tube spindle using a set screw; and FIG. 17 is a view showing the use of a template to prepare a tapped hole for mounting a warning device in accordance with the invention to a driven wheel bearing hub.

DESCRIPTION OF THE PREFERRED EMBODIMENTS

Figure 1:
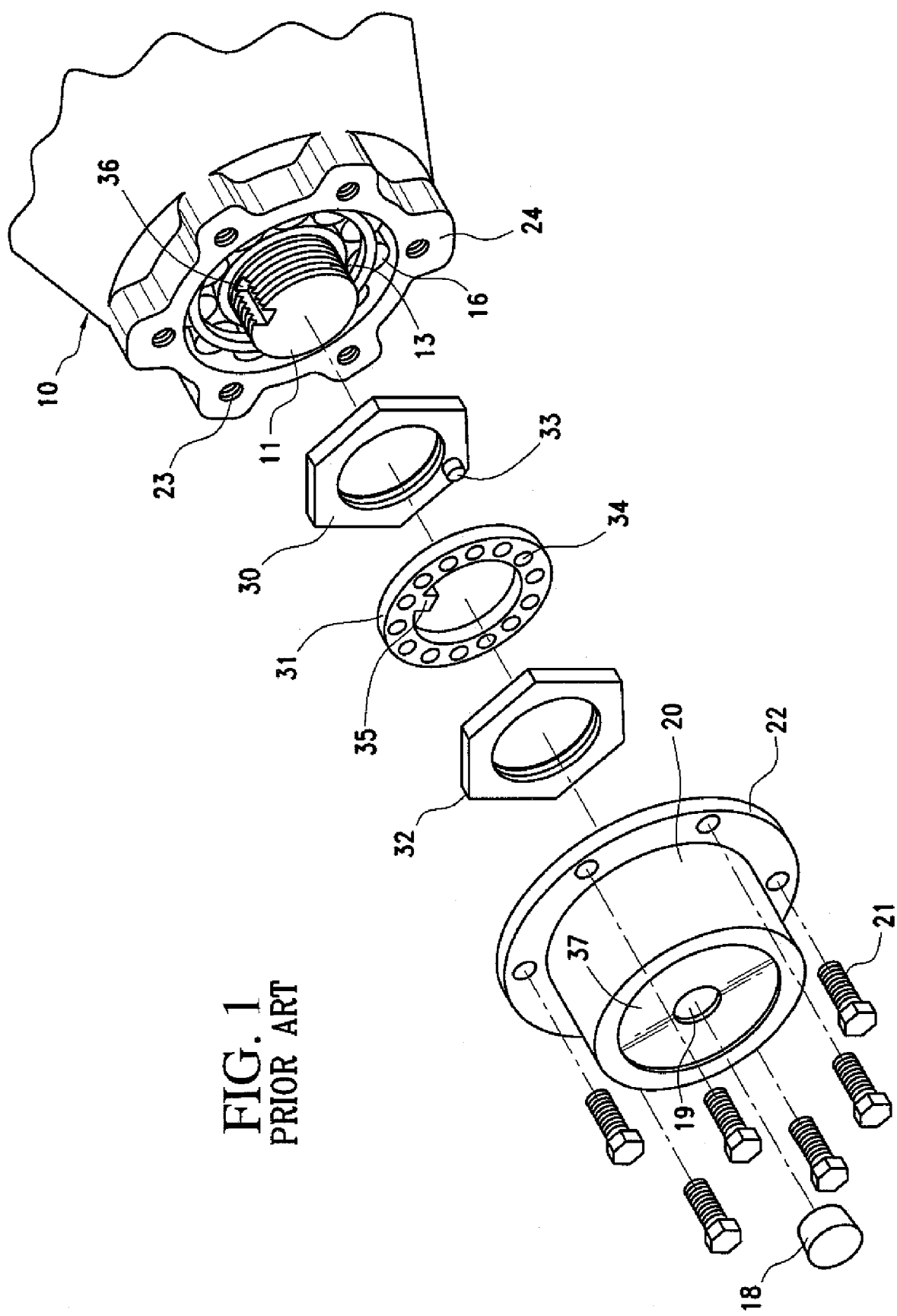
FIG. 1 is an assembly view of a conventional prior art wheel hub assembly including locking members for securing a non-driven wheel bearing hub of a vehicle, such as a truck or trailer, to the support bearings and axle spindle.
Figure 2:
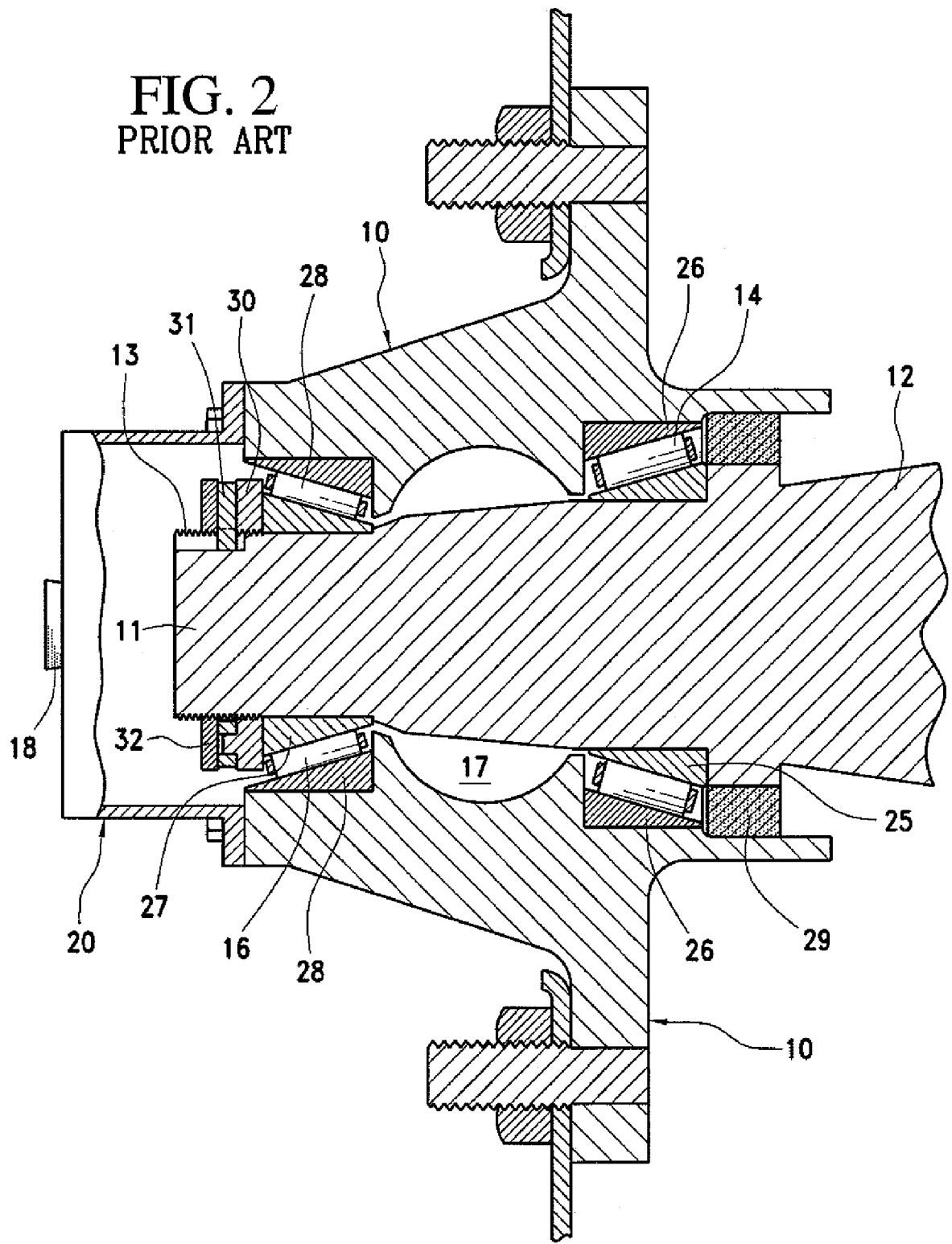
FIG. 2 is a cross section through a spindle of an axle and showing the wheel bearing hub and bearings being secured by the locking members shown in FIG. 1.
Figure 3:
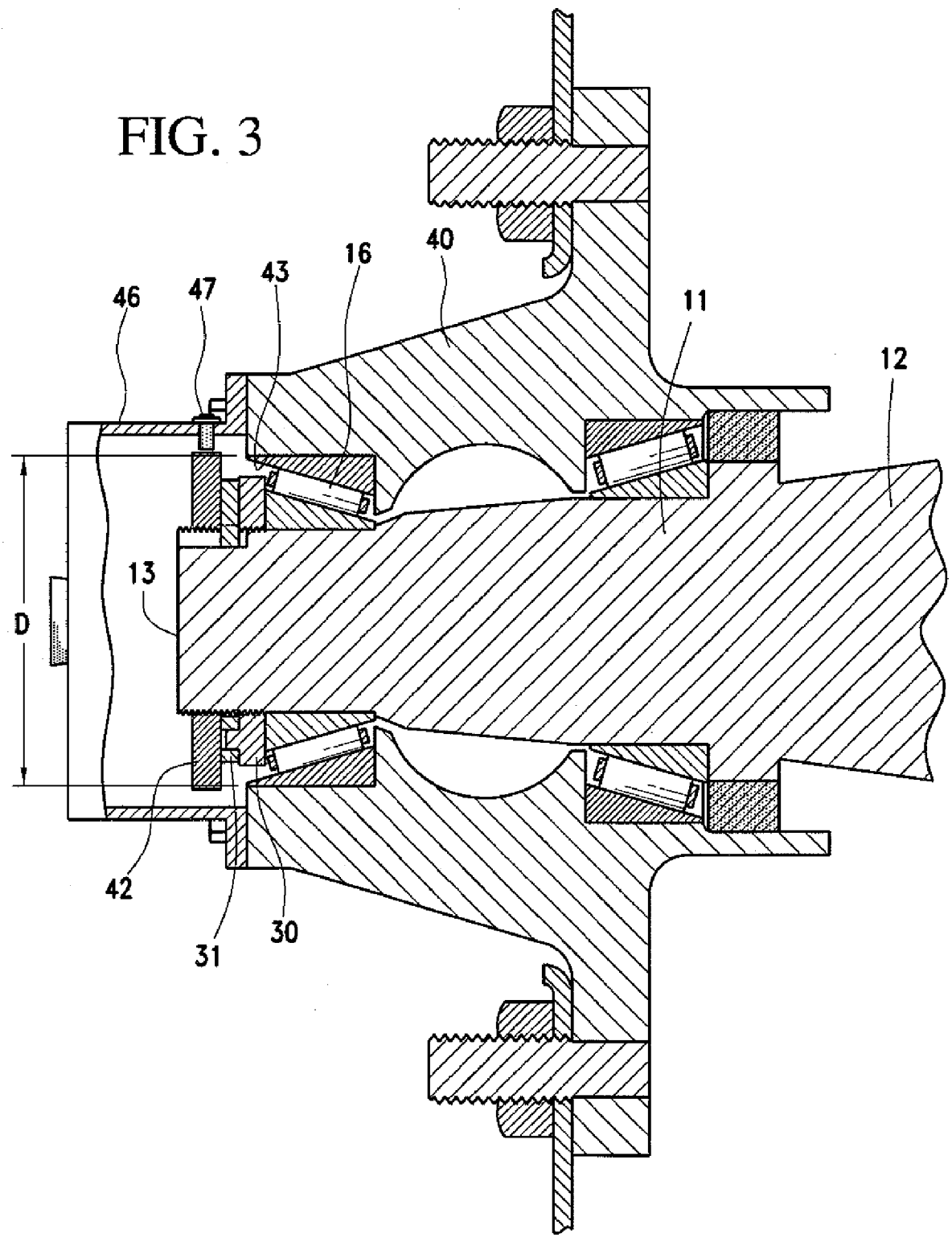
FIG. 3 is a perspective view of a first embodiment of the present invention showing an early warning jam nut for use with a conventional torque applying nut of a wheel hub assembly showing a warning device in a non-deployed position within a cover of the wheel bearing hub.

With continued reference to the drawings, FIG. 3 is a cross section illustrating a first embodiment of a wheel bearing early warning jam nut and indication warning system in accordance with the invention. A wheel bearing hub assembly 40 includes an early warning jam nut 42 adapted to be tightened on a threaded outer end portion 13 of a spindle 11 of a non driven vehicle axle 12 so as to provide a locking force relative to an inner factory nut 30 in order to retain the factory nut 30 in place and prevent loosening of the nut. In preferred embodiments, the early warning jam nut 42 will be made more massive, of a greater diameter and of a heavier grade/ higher strength steel than the inner factory nut 30. A lock washer may be seated between the jam nut 42 and nut 30.

As shown in FIG. 3, the diameter of early warning jam nut 42 is shown as being larger than that of the factory nut 30, and is also as large or slightly larger than the diameter "D" of an outer bearing bore 43 of the wheel bearing hub. So sized, should the factory nut 30 become loose, the more massive and larger diameter of the restraint safety jam nut 42 will help to inhibit disengagement of the wheel bearing hub from the axle, should the bearings begin to fail. This barrier will give a driver or operator time to discover the dangerous condition of the wheel bearing hub and take appropriate action to control the vehicle so that repairs can be made before the wheel bearing hub and related brake drum, wheel and tire assembly separates from the axle.

In the first embodiment, an early warning device 47 is disposed in a cover 46 of wheel bearing hub assembly 40 and is configured to generate a visual indication, apparent from a non-invasive visual inspection, that the wheel bearing hub 40 has deviated from its normal operating position. That is, the wheel bearing hub is not rotating correctly relative to the bearings. The warning device 47 includes an indicator 48 which extends through an opening made in the wheel bearing hub cover 46 and has an inner end 49 end positioned proximal to the early warning jam nut 42, axle spindle 11, or factory nut 30. As shown, the inner end 49 is proximal to the jam nut 42. Indicator 48 has an outer end that is colored to provide a visual indication that, when extended from the wheel bearing hub, indicates a potential problem within the wheel bearing hub.

Figure 4:
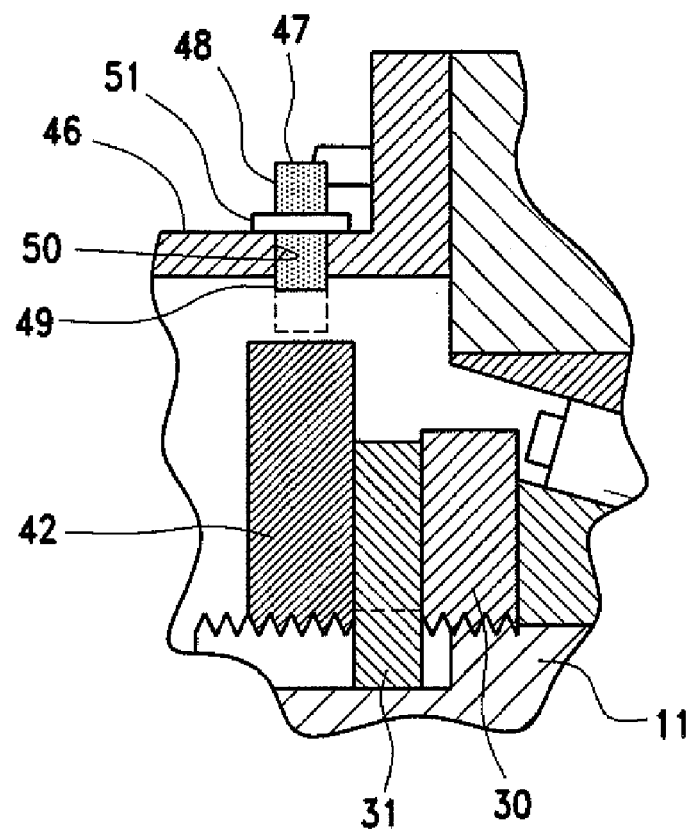
FIG. 4 is a view similar to FIG. 3 showing the visual warning device in an extended or deployed position.
Figure 5:
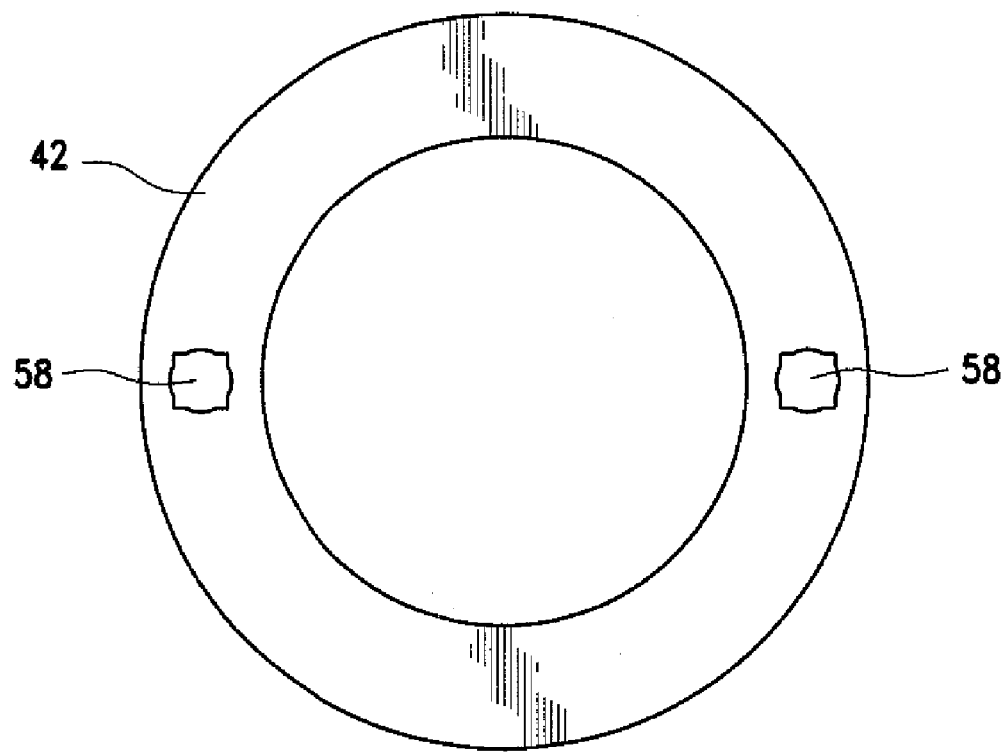
FIG. 5 is a front elevation of the early warning jam nut of the embodiment of FIG. 3.

In the embodiment shown in FIGS. 3 and 4, indicator 48 is retained within an opening 50 of cover 46 by a compression member or ring 51, which allows for relative movement of the indicator within the opening 50 and yet seals the opening. If there is irregular movement of wheel bearing hub 40 about its rotational axis, the early warning jam nut 42 will push the indicator so as to extend it through compression ring 51, thereby providing a visual indication of such movement, as is illustrated in FIG. 4.

Figures 6, 7:
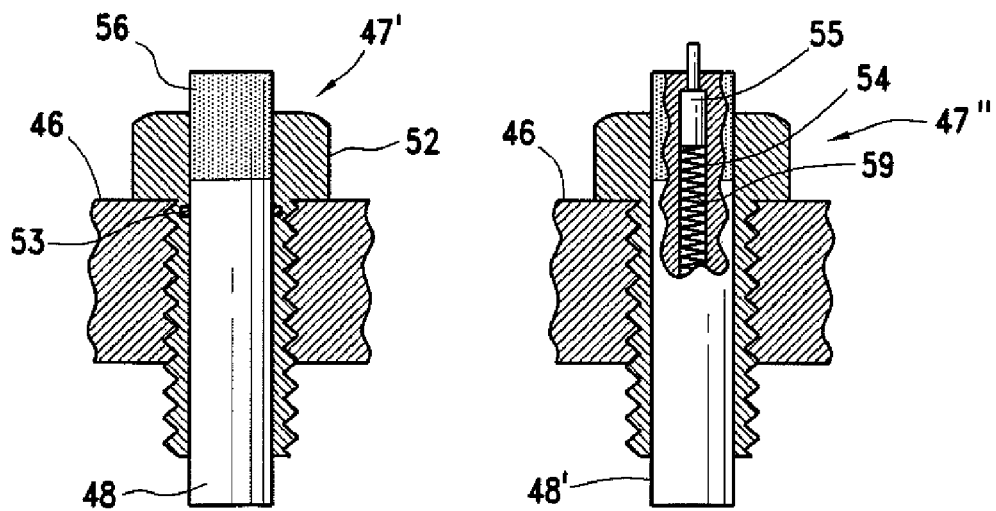
FIG. 6 is a cross section of a first embodiment of warning indicator of the invention.
FIG. 7 is a cross section of a second embodiment of warning indicator including both a motion indicator and a temperature sensor or indicator.
Figure 8:
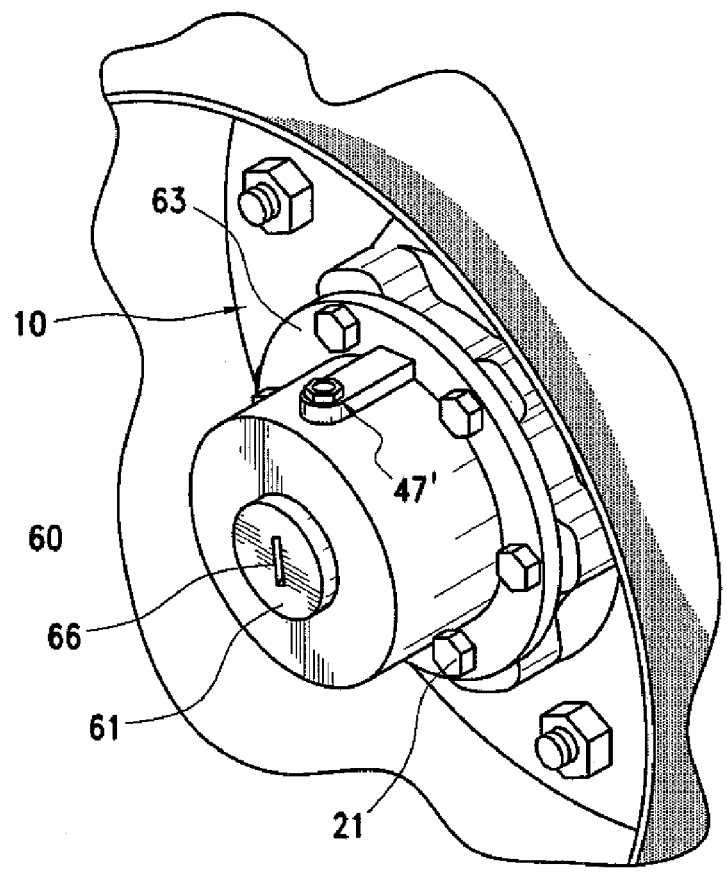
FIG. 8 is a perspective view of a second embodiment of the present invention showing a new wheel bearing hub cover secured to an outer face of a non-driven wheel bearing hub and also showing a warning device in a non-deployed position within the cover.

In other embodiments, as shown in FIG. 6, the warning device 47' includes a housing 52 that is mounted through the side of the cover 46. The housing 52 includes a bore in which the indicator 48 is slidably mounted. A seal or O-ring 53 is mounted with the housing 52 to prevent lubricant from escaping from within the wheel bearing hub. The outer end 56 of the indicator 48 may be colored, such as red.

With reference to FIG. 7, another embodiment of warning device 47" is shown that is designed to give a visual indication of both the improper motion or rotation of the wheel bearing hub as well as an indication that the temperature within the wheel bearing hub has exceeded a predetermined temperature suggesting either a low lubricant level or some other mechanical problem exists within the bearings or wheel bearing hub. In this embodiment, the oscillation or wobble indicator 48' includes a central bore 54 in which a piston member 55 is movably mounted A spring 59 made of a shaped memory alloy, such as a nickel-titanium alloy, is position to abut the inner end of the piston member 55. At temperatures below a predetermined temperature the spring is not expanded and the piston member is retained within the indicator 48', however, when the spring is heated to above a predetermined temperature by exposure to the heat within the wheel bearing hub, the spring expands thereby urging the upper portion of the piston to protrude outwardly of the wheel bearing hub to provide an indication of excessive temperatures within the wheel bearing hub. The upper portion of the piston member may be colored, such as orange, to facilitate visual inspection. When the spring cools it will return to its normal configuration leaving the piston extended. The piston member must be manually urged inwardly of the central bore 54 of the indicator 48' thus assuring that the person re-setting the piston member has knowledge of the activation thereof and thus should take corrective action to determine the problem. As opposed to a temperature sensitive metals, gas activated devices and other temperature sensitive elements may be used to activate the sensor or to act as linear actuators.

In the embodiments described above, the inner end of the "pop-out" indicators are put into an operational position by preferably seating against, or being proximal to, the early warning jam nut's circumferential surface 57 inside the wheel bearing hub. The indicator is thus set to monitor any oscillation, wobble and/or relative movement between the inner end of the indicator and the jam nut that can be associated with bearing wear, loosening of the factory restraint nut and/or excessive end play caused by any damage within the wheel bearing hub. The indicators used in the various embodiments according to the invention may be made of a desired color (e.g. red) and be formed of metal, such as stainless steel or brass, or strong plastics such as high density polyethylene and the like.

In some embodiments, other types of visual indicators may also be employed that are adapted to sense a particular bearing hub condition, including electronic and/or electrical sensors, pressure sensors, heat sensors, and the like. Such sensors may be adapted to transmit signals, such as RF signals, representative of the sensed properties to a vehicle's computer such that a warning may be displayed to a vehicle or machine operator. The sensors may further be adapted to transmit such signals to a portable device or other remote device that may be in the possession of the operator, or other person, such as DOT personnel. By way of example, a small sensor may be mounted to the wheel hub such that when the indicator is extended outwardly of the hub, it presence will be detected and a signal transmitted that will inform the driver of the condition.

In other embodiments, in addition to the visual indicators described herein, transducers or other sensors may be disposed in or on the wheel bearing hub which are adapted to detect a physical property of the hub assembly, including, but not limited to heat, vibration, oscillation, lubrication or fluid level, pressure and the like. The transducers or sensors may be adapted to transmit signals representative of sensed conditions via wireless or wired communications links to a vehicle computer and or a remote device.

FIG. 3 is an end view of the first form of the early warning jam nut 42. The restraint locknut 42 may have one or more sockets 58 that may be adapted to fit or cooperatively receive, for example, a standard drive end of a ratchet tool. By way of example, a standard ¾" drive ratchet tool, or other size, may be used with a spanner to install the early warning jam nut 42 and allow for sufficient torque to be applied to effectively lock the inner factory nut 30 in place. Such a standard tool is typically found in repair shops and may be carried in a vehicle. In the preferred embodiments, the early warning jam nut 42 is annular having a generally smooth outer circumference. In other embodiments, the jam nut 42 may have one or more flat outer surfaces. By way of further example, the jam nut may be ½ inch thick or more and is preferably produced of high strength steel alloy, such as a 4140 or similar grade of steel or better, for durability and dependability and precision machined to predetermined specifications.

With specific reference to FIGS. 8-12, a second embodiment of the invention is shown that is particularly suitable for improving the safety and mechanical integrity of wheel bearing hub assemblies that are used with non-driven axles, such as those found on commercial over the road trailers. It should be noted that the wheel hubs may be for either single or dual wheel arrangements. The second embodiment provides an improved wheel bearing hub cover structure and early warning jam nut structure when compared to the first embodiment. The warning devices used with the present embodiment may be one of those as described above.

Figure 10:
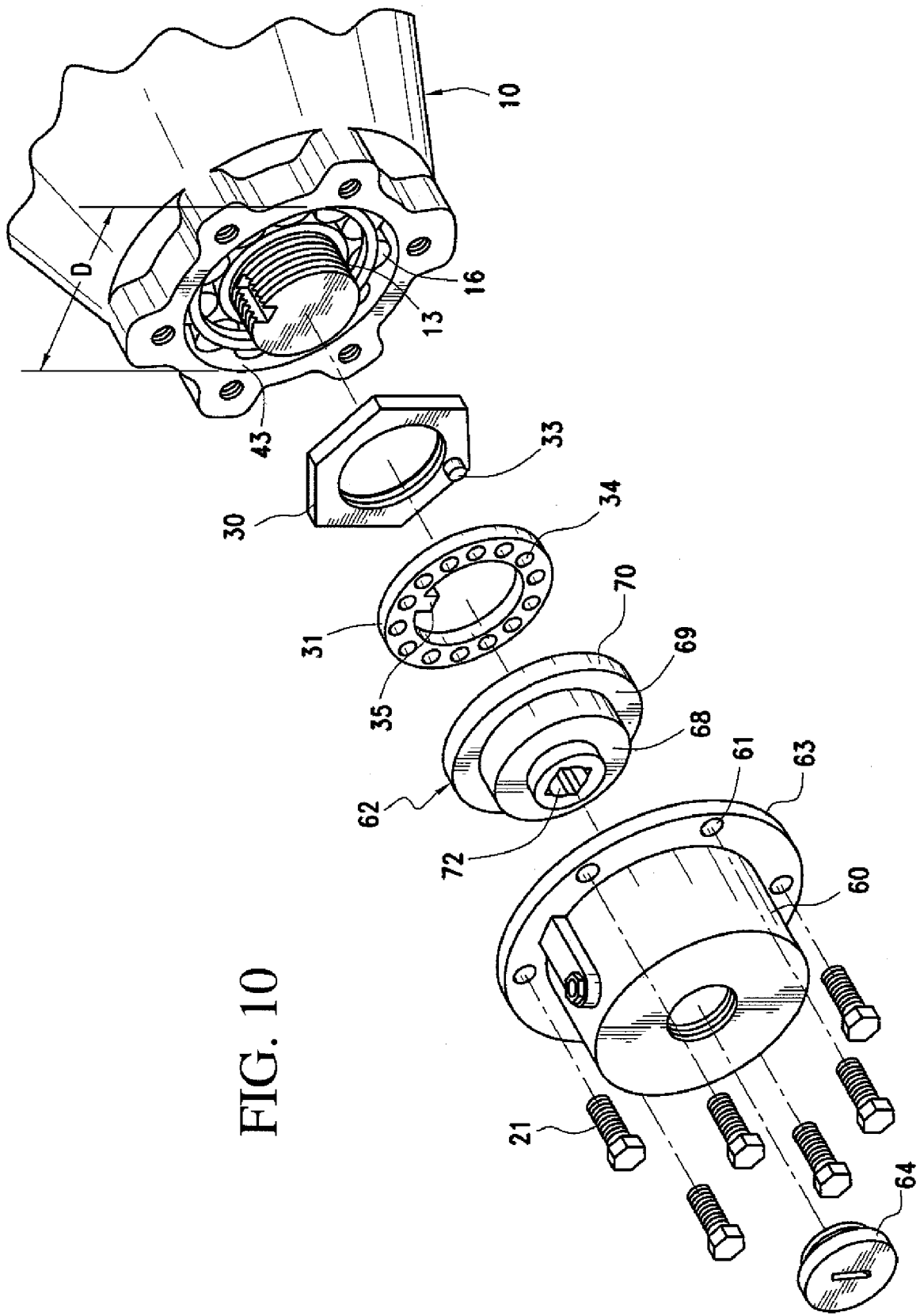
FIG. 10 is an assembly view of an early warning jam nut used with the embodiment of FIG. 8 for retaining the conventional nut in proper position on a threaded end of an axle spindle.
Figure 11:
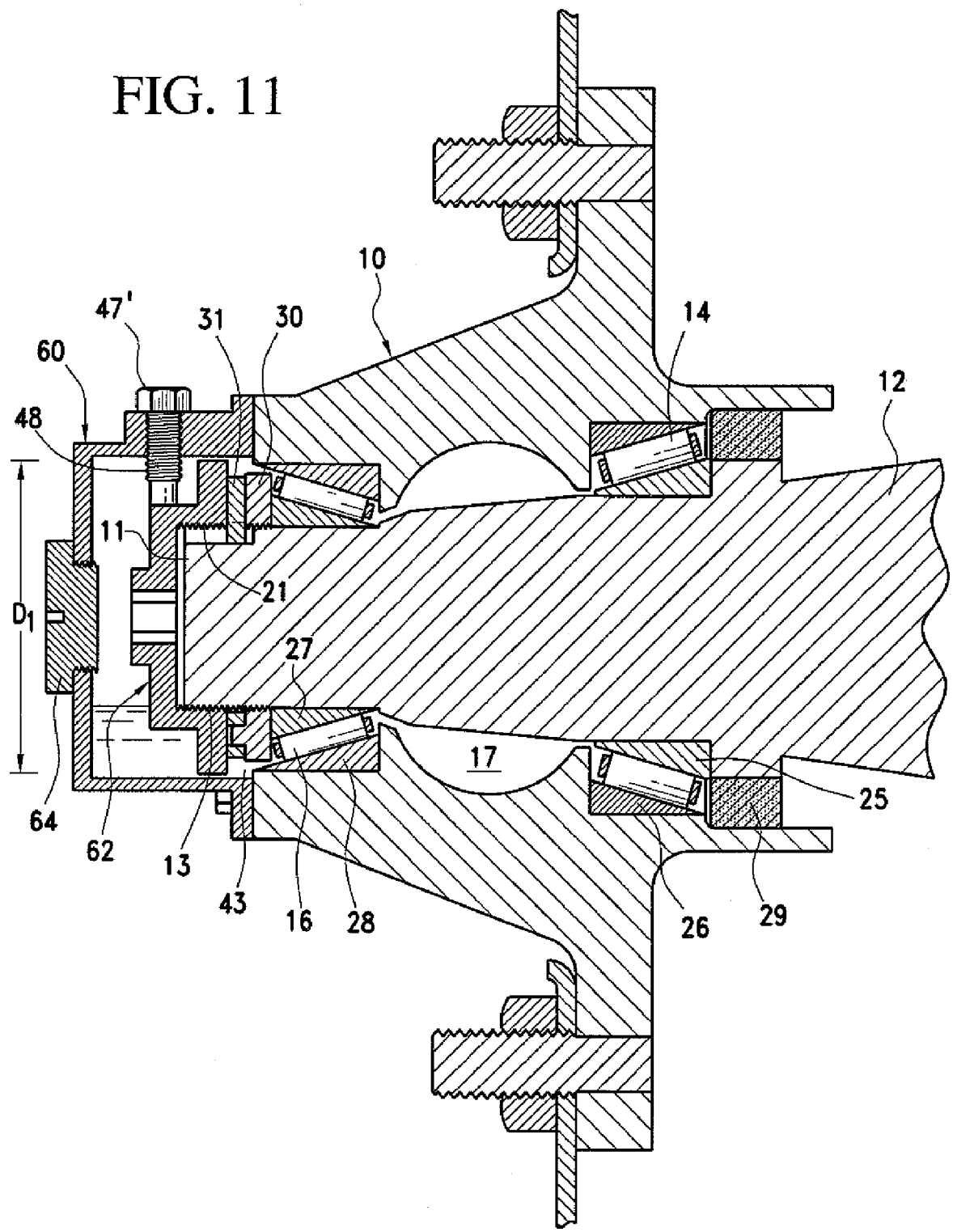
FIG. 11 is a cross section through a wheel bearing hub and a spindle of a non-driven axle showing the visual indicator and warning device relative to the early warning jam nut of the invention wherein the indicator is positioned such that the inner end thereof is proximate to the early warning jam nut.
Figure 13:
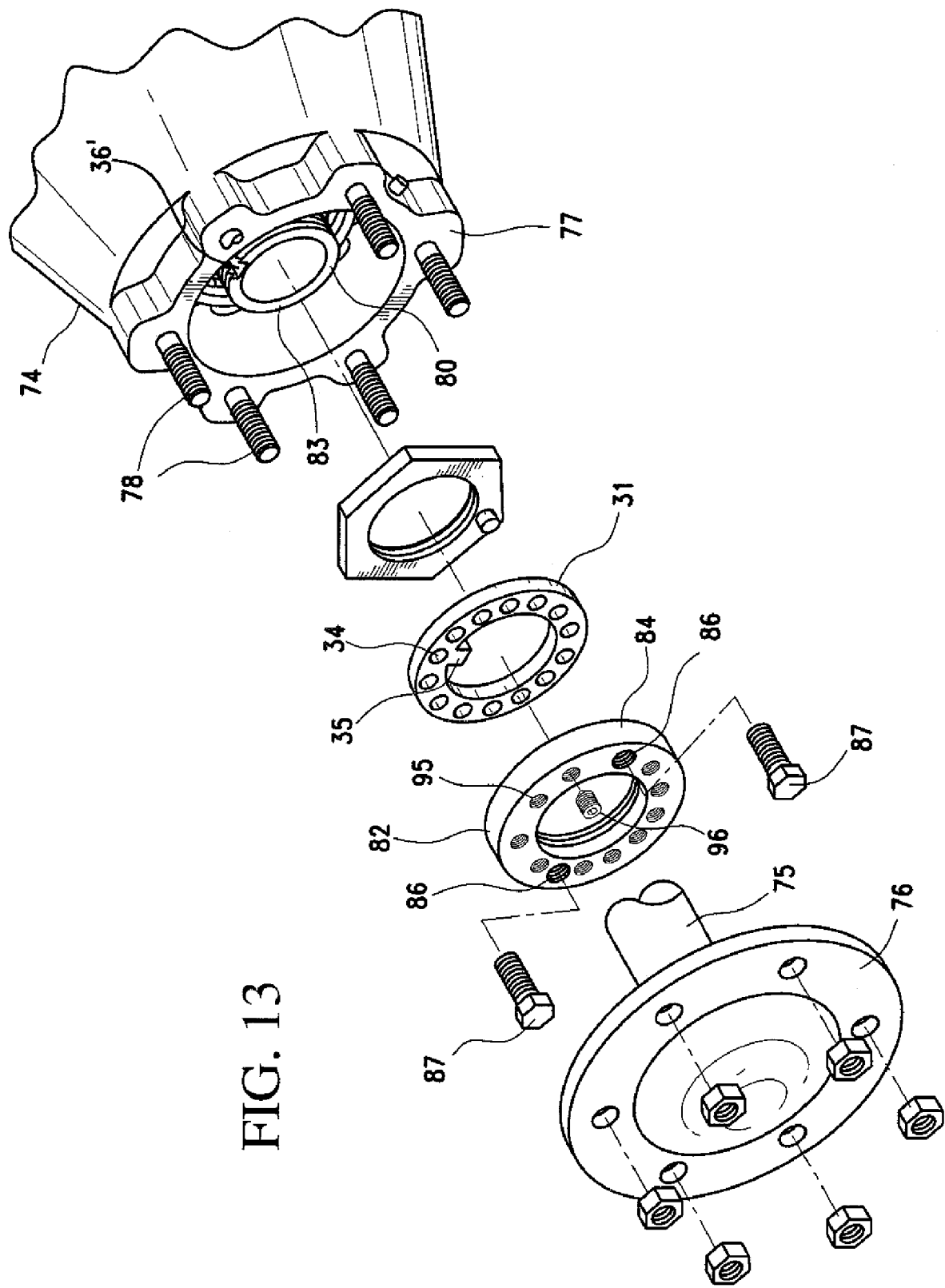
FIG. 13 is an assembly view of a third embodiment of the invention for use with driven wheel hubs wherein the features of the early warning jam nut have been modified.
Figure 14:
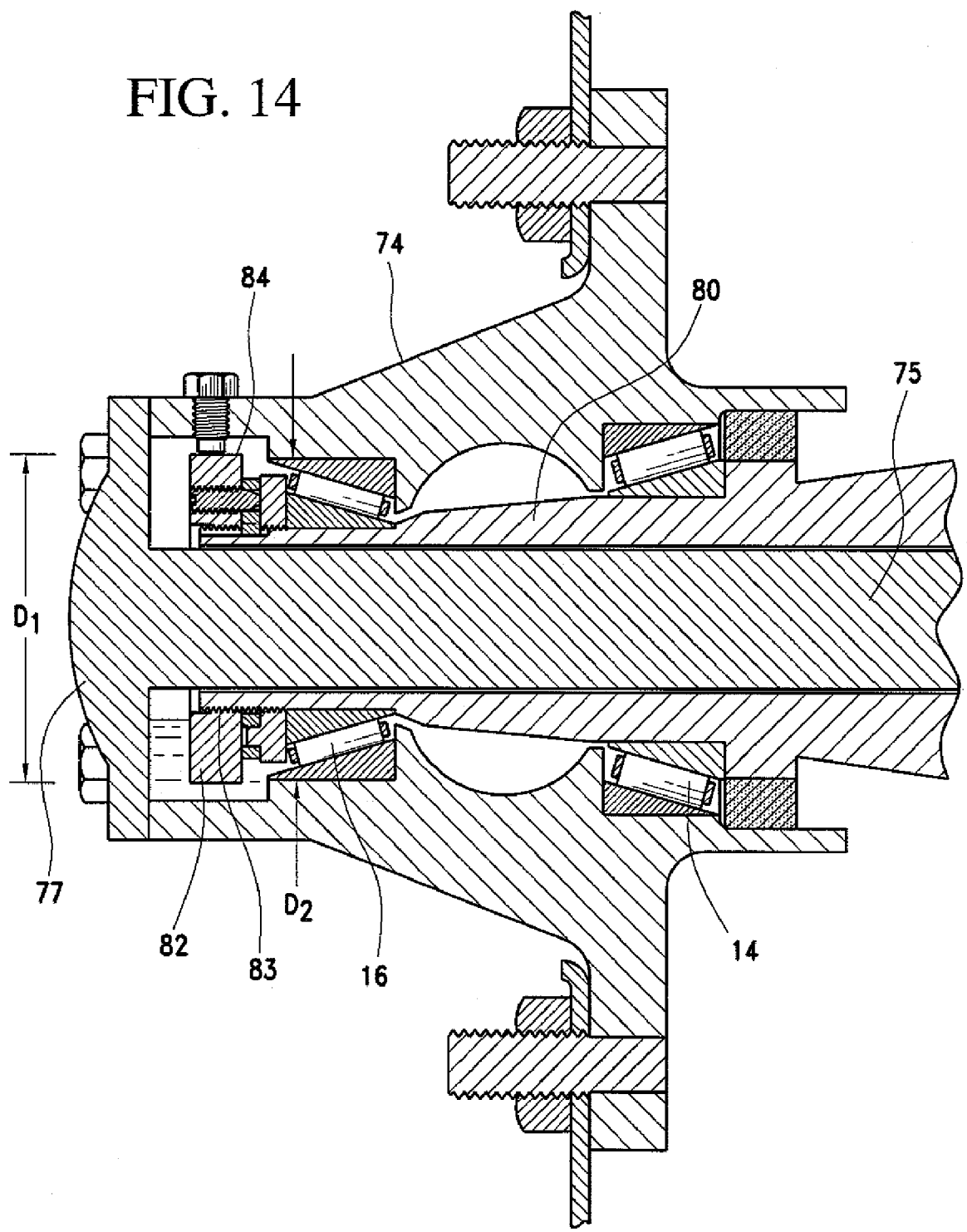
FIG. 14 is a cross section through a wheel bearing hub and a drive tube spindle of the driven wheel bearing hub and axle showing the visual indicator of the warning device relative to the early warning jam nut of the invention wherein the indicator is position such that the inner end thereof is proximate to the jam nut.

With reference to FIGS. 10 and 11, this embodiment is designed to be used with a conventional wheel bearing hub 10 mounted to freely rotate about a spindle 11 end of a non-driven axle 12. The spindle includes a threaded end portion 13. The wheel bearing hub is seated about a bearing assembly that includes inner tapered roller bearings 14 and outer tapered roller bearings 16. The wheel bearing hub includes an inner cavity or bearing housing 17 that forms a lubricant reservoir to retain lubricant that fills the lower portion of the cavity to a predetermined level. The outer bore 43 of the bearing cavity has a diameter "D". The inner and outer tapered roller bearings 14 and 16 are seated between inner and outer bearing journals 25 and 26 and 27 and 28, respectively. The bearing assembly is sealed opposite the hub cover by an inner lubricant seal 29. The inner and outer bearings 14 and 16 are designed to be retained in place on the spindle by a combination of a nut 30, a lock washer 31 and a early warning jam nut 62. The components of the wheel hub and the bearings of this embodiment that are the same as described with respect to the prior art discussed herein are described using the same reference numbers.

The present embodiment provides a unique wheel bearing hub cover 60 and unique jam nut 62. The cover 60 is mounted to enclose the cavity by bolts 21 that pass through openings 61 in an outer flange 63 of the cover and are threaded into threaded openings 23 in an outer face 24 of the wheel bearing hub. An O-ring, not shown, is provided between the face of the wheel bearing hub and the cover to prevent lubricant leakage from within the bearing cavity. The cover 60 is formed of aluminum having a generally centrally oriented threaded opening 65 in the outer face thereof which is normally sealed by a threaded plug 64 that includes an O-ring seal 67 for preventing lubricant leakage around the plug. Materials other than aluminum, such as stainless or other steel, non ferrous metals and heavy duty plastics may also be used. The outer face of the plug includes a recess 66 in which a coin or an end of a conventional screw driver may be inserted to manipulate the plug. The bottom of the threaded opening 65 is generally aligned with the fill level for lubricant within the bearing cavity so that it is easy to determine if the oil level is low upon removal of the plug.

Figure 12:
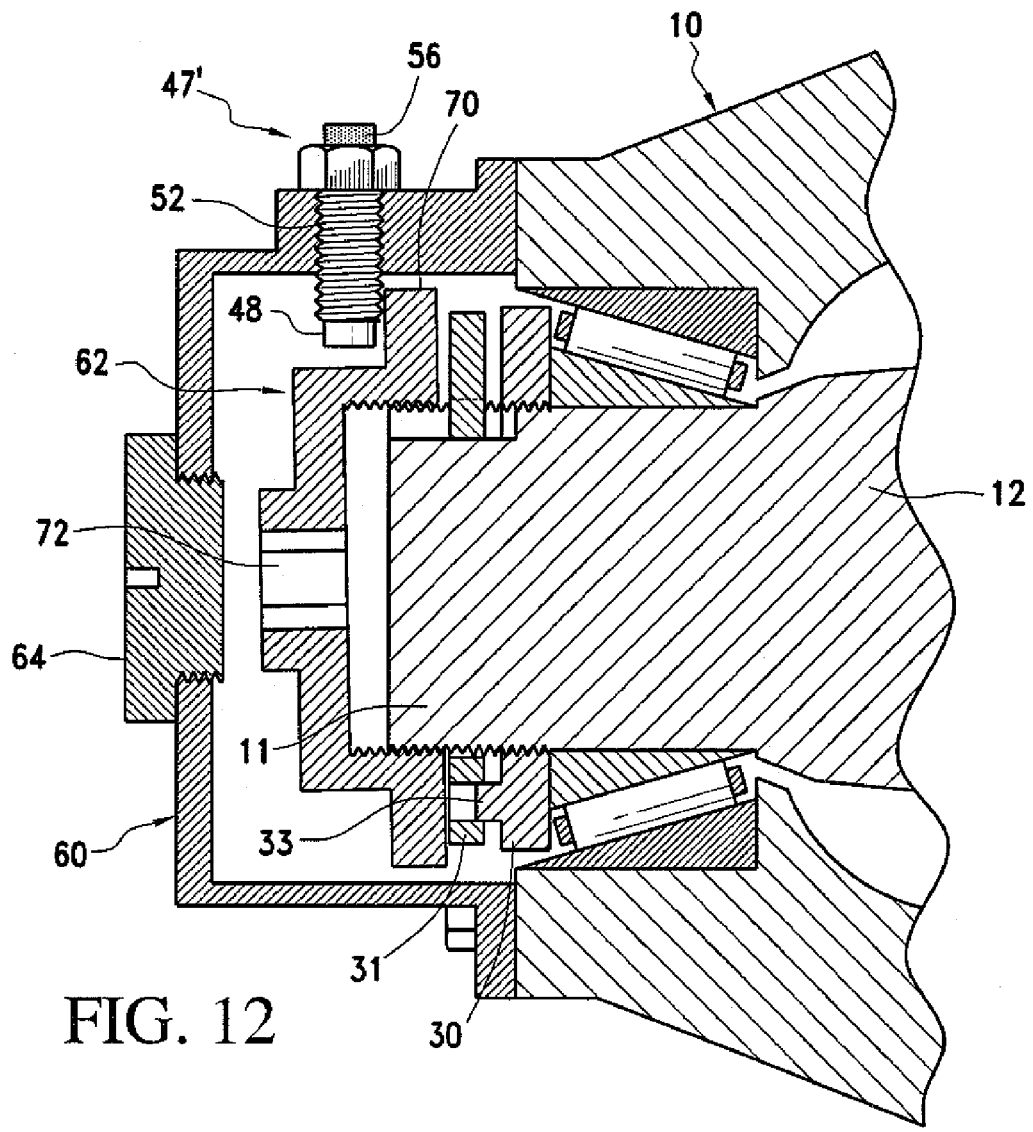
FIG. 12 is a cross section similar to FIG. 11 showing the warning indicator forced outside of the wheel bearing hub cover by the early warning jam nut engaging the indicator as the wheel hub wobbles or oscillates slightly to thereby give an indication that the bearings have become worn or damaged.

With continued reference to FIGS. 10-12, the early warning jam nut 62 of the present embodiment is somewhat of a "hat-shaped" structure having a circular central domed portion 68 from which extends a circular flange 69. The flange defines an outer smooth annular wall 70 that is designed to extend proximate to the inner end of the warning indicator. The domed portion defines an inner threaded cavity 71 with the threads being provided to mesh with the threads of the end portion 13 of the spindle 12 when the jam nut is secured to the spindle to lock the washer 31 and the nut 30 in place. Due to the size of the domed portion, it is possible to provide at least twice as many threads on the jam nut to secure the jam nut to the spindle as compared to conventional jam nuts. To facilitate the manner in which the early warning jam nut 62 is adjusted relative to the spindle, a socket opening 72 is provided in an area at the center of the domed portion. The socket opening may, for example, be configured to cooperatively receive a drive end of a conventional ¾" drive ratchet tool.

The early warning jam nut is formed of a high strength 4140 or similar grade of steel with a height "H" of 2½ to 3 inches and a diameter $D_1$ at the outer circular edge of the flange that is generally equal to or greater than the diameter "D" of the outer bore portion of the bearing cavity where the outer bearings 16 are positioned. As previously described, it is important that the jam nut not only be much easier to adjust than prior art lock or jam nuts in order to provide maximum force to retain the inner nut in place, but the jam nut must be strong enough and large enough to help prevent the wheel hub from becoming disengaged, at least for a short period of time, from the axle in the event of bearing failure within the wheel bearing hub. Due to the larger diameter of the jam nut, the wheel bearing hub cannot simply bypass or "walk" or wobble over the jam nut, as is possible in the prior art.

Figure 9:
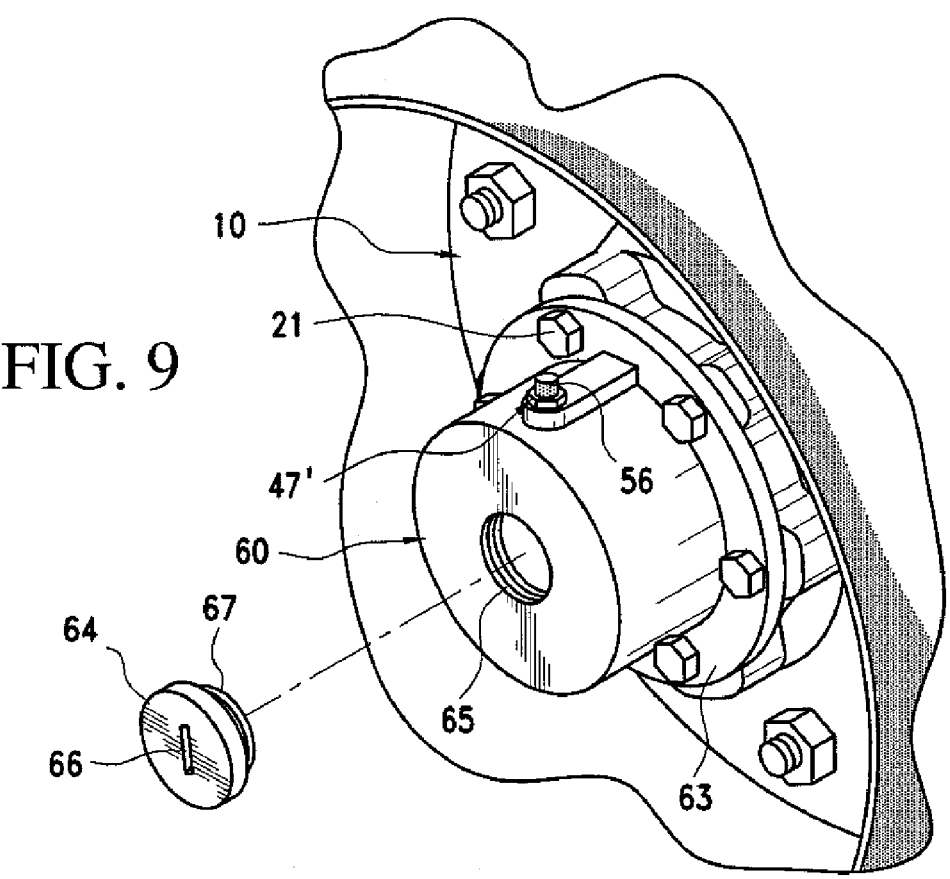
FIG. 9 is a view similar to FIG. 8 showing a threaded center plug of the hub cover removed and showing the visual warning device in an extended or deployed position.

During assembly and before securing the cover to the wheel bearing hub, a wrench is used to thread the inner nut 30 on the threaded end 13 of the spindle 11. Thereafter, lock washer 31 is placed over the end of the spindle. As described with respect to the prior art, to prevent the nut 30 from loosening, the nubbin 33 thereon cooperatively seats within one of the plurality of holes 34 that are provided in the lock washer 31. The locking tab 35 of the washer is cooperatively seated within the channel or keyway 36 formed in the threaded end portion 13 of the spindle 11. Thereafter, the early warning jam nut 62 is threaded to the threaded end portion of the spindle and tightened using the conventional ratchet tool to retain the wheel bearing hub and bearing assembly in place. When the jam nut 62 is fully seated, the inner end of the indicator 48 will be proximate to the outer smooth annular wall 70 of the flange thereof, as shown in FIG. 11. When the wheel bearing hub is in motion, any deviation from a proper rotational track of the wheel hub, such as a wobble or oscillation, will result in the early warning jam nut 62 urging the indicator 48/48' outwardly relative to the wheel bearing hub, as shown in FIGS. 9 and 12.

With specific reference to FIGS. 13-17, a third embodiment of the invention is shown wherein the invention has been modified to improve and provide similar indications and warnings for a driven wheel hub 74. The driven wheel hub is drivingly connected to a drive axle 75 that is secured to a wheel hub cover 76 bolted or otherwise secured to an outer face 77 of the wheel hub by the use of bolts or pins 78. It should be noted that the drive axle must extend centrally within a drive tube axle spindle 80 and thus the early warning jam nut 62 of the second embodiment cannot be used as it includes the end cap or domed portion that would obstruct passage of the drive axle. The components of the present embodiment that are the same as previous embodiments have the same reference numbers and will not be further described with respect to this embodiment, such as the inner and outer roller bearings 14 and 16 mounted about the drive tube spindle 80.

As the driven wheel hub 74 and cover 76 must remain of conventional construction to permit the wheel hub to rotate with the drive axle, the warning device(s) 47' and 47" of the present invention are designed to be mounted through a side wall the body of the wheel bearing hub spaced inwardly from the outer face 77 thereof. When the early warning jam nut 82 of the present embodiment is tightly secured to the threaded end portion 83 of the drive tube axle spindle 80, the inner end of the indicators 48/48' will be proximate to a peripheral surface 84 of the jam nut. In this manner, if any relative wobble or oscillation develops between the driven wheel bearing hub and the drive tube axle spindle, the indicator will be forced out of the indicator housing as previously described.

Although the warning device may be installed within openings provided there for during manufacture of the driven wheel bearing hubs, the invention is also usable to retrofit existing driven wheel bearing hubs. To facilitate the placement of the warning devices, a kit is provided that includes a template 90 for measuring and positioning a drill bushing in a proper location to allow for drilling and taping a hole or opening 91 in which the sensor or indicator housing 52 will be placed. The template is mounted to two adjacent tapped openings 92 in the face 77 of the driven wheel hub or fitted over existing studs or pins. The main body of the template extends there from between the adjacent bolt receiving openings or studs and supports a tapping tool or drill guide 94 that is used to ensure that the threaded opening that is to be made for the housing is at a true 90° angle relative to the peripheral surface 84 of the jam nut. The housing of the warning device is thereafter threaded into the tapped opening until a stop flange provided thereon abuts the driven wheel hub housing. At this position the inner end of the indicator will be proximate the peripheral surface of the jam nut. The threads that are created are preferably tapered to as to ensure that the indicator housing is sealed when fully seated.

The early warning jam nut 82 of the present embodiment is a ring member that is preferably constructed of a hardened 4140 or similar grade of steel or better as opposed to steels used in conventional lock or jam nuts. Further, the early warning jam nut has a diameter that is greater than conventional lock nuts and is markedly thicker than conventional lock nuts so that the early warning jam nut functions as a safety stop to help prevent, for at least a short period of time, the wheel hub from being able to "walk" over or past the jam nut should the outer wheel bearings completely fail Generally the outer dimension $D_1$ of the jam nut should be equal to or greater than the diameter $D_2$ of the outer bearing cavity of the driven wheel hub and the thickness thereof is preferably ¾" or greater.

To mount the early warning jam nut to the threaded end portion of the drive axle to lock the inner nut 30 and the lock washer 31 in place, a tool bar 85 is secured to opposite threaded openings 86 in the early warning jam nut using bolts 87. The tool bar includes a central opening or socket 88 of a configuration to accept a drive end of a conventional drive socket tool, as previously discussed. Once the safety jam nut is tightly seated, the tool bar is removed after which the bolts may be reseated with the threaded opens so as to abut the adjacent washer 31 to thereby function as friction locks to prevent accidental loosening of the early warning jam nut relative to the drive tube axle spindle. To provide a further lock for the early warning jam nut 82 to ensure that the jam nut does not become loosened by forces associated with the rotation of the drive axle, a series of tapped openings 95 are provided in uniquely spaced relationship relative to one another about the safety locknut. The tapped openings are spaced such that, regardless of the rotational position of the jam nut relative to the washer, at least one of the tapped openings will be in direct alignment with one of the holes 34 in the lock washer. A high strength set screw 96 is positioned within the aligned tapped opening and threaded until completely seated within the aligned hole in the lock washer. If the set screw is in the appropriate hole, the set screw will be flush with the outer surface of the jam nut when completely seated. Therefore, if the set screw extends from the outer face of the jam nut, the set screw has been placed in the incorrect tapped opening. In this manner, the jam nut 82 can not rotate relative to the lock washer 31 or the nut 30 and is thus fixed relative to the driving axle. It should be remembered that the lock washer 31 is fixed to the drive tube axle spindle 80 because the locking tang 35 seats within a channel 36' in the drive tube axle spindle.

To further improve upon the combination of locking elements used to retain the wheel bearing hubs secured, the lock washers 31 are preferably constructed of hardened steel, such as a 4140 or better grade, and made thicker, possibly one half inch or more, than prior art lock washers and thus stronger than prior art washers so that the likelihood of failure of the locking tangs associated therewith is minimal.

The operation of the warning and indicating device of this embodiment is the same as the second embodiment. Should a relative change occur in the rotational positions of the wheel bearing hub and the bearings, the indicator 48/48' will be forced outwardly of the wheel bearing hub to give the visual indication of a problem. Also, when the warning device also includes a temperature sensor 55, should the temperature within the wheel bearing hub bearing cavity elevate above a predetermined level, the temperature indicator will extend outwardly of the wheel bearing hub to give a visual warning.

Devices in accordance with of the present invention may be produced and/or installed by power unit drive axle manufacturers, vehicle assembly manufacturers, dealers and/or end users. Various embodiments may be shipped as a single unit, others may be shipped as sub-assemblies and used in the vehicle and other machinery production processes.

The visual indicators and/or early warning jam nuts in accordance with the various embodiments of the present invention are cost effective, do not require specialized tools to install, and may be quickly and easily installed. Further, because embodiments of the present invention may prevent serious accidents from occurring, such as due to large commercial trucks losing wheel assemblies while traveling at highway speed, insurance rates for trucking companies, drivers, machinery operators and the like may be lower, which in turn could reduce shipping rates and manufacturing costs. Embodiments of the invention may be designed for use an all types of the trucking equipment, passenger vehicles, machinery, and any other wheel assemblies that include bearing hubs mounted to bearings. Embodiments of the invention may be installed in after market vehicles and machinery as well as incorporated into new vehicle and machinery production. Further, embodiments may be utilized by a wide range of end users, including the trucking and automotive industry, as well as other applications where damage, accident or injury could occur due to an unsafe or abnormal condition and potential failure of a bearing and/or retaining device of a wheel or other bearing hub assembly.

In addition to the description and illustrations of various embodiments above, it is to be understood that a wide variety of alternate and/or equivalent embodiments or implementations calculated to achieve the same purposes may be substituted for the embodiments shown and described without departing from the scope of the present invention and thus the invention is only defined by the scope of the claims when interpreted in view of this specification and drawings and the state of the art.

We claim:

1. An early warning system for providing an indication of possible problems within a bearing hub assembly including a bearing hub defining a bearing cavity that is closed by a bearing hub cover and in which bearing cavity bearings are retained to permit rotation of the bearing hub relative to one of a support or driven member and wherein the bearings are retained in place by a nut and lock washer mounted to either the support or driven member, the early warning system including: a warning device adapted to be mounted through the bearing hub cover and including an indication means having an inner end adapted to extend within the bearing hub and an outer end that is movable outwardly with respect to the bearing hub cover so as to be visually observable, an early warning jam nut adapted to be threaded to either the support or driven member so as to abut the lock washer, and said early warning jam nut having an outer peripheral surface adapted to engage said inner end of said indication means should the bearing hub not rotate properly about a rotational axis defined by the support or driven member to thereby force said outer end of said indication means to extend outwardly from the bearing hub to thereby provide a warning of potential problems within the bearing hub.

2. The early warning system of claim 1 in which a diameter of said early warning jam nut is at least substantially equal to or greater than a diameter of a bore within the bearing cavity in which the bearings are seated.

3. The early warning system of claim 1 wherein said early warning jam nut is formed in a hat-shape having a central domed portion defining in inner threaded cavity and from which extends an annular flange defining said outer peripheral surface, and a socket opening formed in central face of said domed portion for receiving a tool that can be used to adjust said early warning jam nut relative to the support.

4. The early warning system of claim 3 wherein said early warning jam nut includes a plurality of spaced threaded openings that are spaced relative to one another around said annular flange such that at least one of said plurality of spaced threaded openings will align with one of a plurality of openings in the lock washer, and means receivable within said plurality of spaced threaded openings and of a size to extend into an align one of said plurality of openings in said lock washer.

5. The early warning system of claim 1 in which the early warning jam nut is formed as a ring member having inner threads adapted to engage threads of the driven member, a bar member, means for selectively securing said bar member across said ring member, and a tool receiving socket within said bar member for facilitating adjustment of said early warning jam nut relative to the drive spindle tube.

6. The early warning system of claim 5 wherein said early warning jam nut includes a plurality of spaced threaded openings that are spaced relative to one another around said ring member such that at least one of said plurality of spaced threaded openings will align with one of a plurality of openings in said lock washer, and means receivable within said plurality of spaced threaded openings of a size to extend into an aligned one of said plurality of openings in said lock washer.

7. The early warning system of claim 1 in which the early warning jam nut is formed as a ring member having inner threads adapted to engage threads of the support or driven member, and a pair of spaced tool receiving sockets within said ring member for facilitating adjustment of said early warning jam nut relative to the support or driven member.

8. An early warning system for providing an indication of possible problems within a wheel bearing hub assembly including a wheel bearing hub defining a wheel bearing cavity that is closed by a wheel bearing hub cover or axle cap and in which bearing cavity bearings are retained to permit rotation of the wheel bearing hub relative to one of a non driven axle spindle and a drive tube spindle of a driven axle and wherein the bearings are retained in place by a nut and lock washer mounted to either the axle spindle or drive tube spindle, the early warning system including: a warning device adapted to be mounted through the wheel bearing hub cover and including an indication means having an inner end adapted to extend within the wheel bearing hub and an outer end that is movable outwardly with respect to the wheel bearing hub cover so as to be visually observable, an early warning jam nut adapted to be threaded to either the axle spindle or drive tube spindle so as to abut the lock washer, and said early warning jam nut having an outer peripheral surface adapted to engage said inner end of said indication means should the wheel bearing hub not rotate properly about a rotational axis defined by the axle spindle or drive tube spindle and thereby force said outer end of said indication means to extend outwardly from the wheel bearing hub to thereby provide a warning of potential problems within the wheel bearing hub.

9. The early warning system of claim 8 in which a diameter of said early warning jam nut is at least substantially equal to or greater than a diameter of a bore within the bearing cavity in which the bearings are seated.

10. The early warning system of claim 8 wherein said early warning jam nut is formed in a hat-shape having a central domed portion defining in inner threaded cavity and from which extends an annular flange defining said outer peripheral surface, and a socket opening formed in central face of said domed portion for receiving a tool that can be used to adjust said early warning jam nut relative to an axle spindle.

11. The early warning system of claim 10 wherein said early warning jam nut includes a plurality of spaced threaded openings that are spaced relative to one another around said annular flange such that at least one of said plurality of spaced threaded openings will align with one of a plurality of openings in the lock washer, and means receivable within said plurality of spaced threaded openings and of a size to extend into an align one of said plurality of openings in said lock washer.

12. The early warning system of claim 10 including a wheel bearing hub cover having a cylindrical housing having an inner end from which extends a generally annular flange having spaced openings therein for receiving bolts for securing the wheel bearing hub cover to the wheel bearing hub, said wheel bearing hub cover including an outer face that closes an outer end of said cylindrical housing, a threaded opening generally centrally of said outer face, a threaded plug cooperatively receivable within said threaded opening, and said threaded opening being of a size to permit a conventional ratch type tool to be inserted there through to engage said tool receiving socket.

13. The early warning system of claim 10 wherein said warning device further includes a temperature sensor mounted within said housing, said temperature sensor being adapted to sense temperatures within the bearing cavity and including means for providing a warning indication if temperatures with the bearing housing exceed a predetermined temperature.

14. The early warning system of claim 8 in which the early warning jam nut is formed as a ring member having inner threads adapted to engage threads of the drive tube spindle, a bar member, means for selectively securing said bar member across said ring member, and a tool receiving socket within said bar member for facilitating adjustment of said early warning jam nut relative to the drive spindle tube.

15. The early warning system of claim 14 wherein said early warning jam nut includes a plurality of spaced threaded openings that are spaced relative to one another around said ring member such that at least one of said plurality of spaced threaded openings will align with one of a plurality of openings in said lock washer, and means receivable within said plurality of spaced threaded openings of a size to extend into an aligned one of said plurality of openings in said lock washer.

16. The early warning system of claim 13 wherein said warning device further includes a temperature sensor mounted within said housing, said temperature sensor being adapted to sense temperatures within the bearing cavity and including means for providing a warning indication if temperatures with the bearing housing exceed a predetermined temperature.

17. The early warning system of claim 8 in which the early warning jam nut is formed as a ring member having inner threads adapted to engage threads of a non driven axle spindle or drive tube spindle, and a pair of spaced tool receiving sockets within said ring member for facilitating adjustment of said early warning jam nut relative to the drive spindle or drive tube spindle.

18. The early warning system of claim 8 wherein said warning device further includes a temperature sensor mounted within said housing, said temperature sensor being adapted to sense temperatures within the bearing cavity and including means for providing a warning indication if temperatures with the bearing housing exceed a predetermined temperature.

19. In a wheel bearing hub assembly including a wheel bearing hub defining a wheel bearing cavity that is closed by a wheel bearing hub cover or axle cap and in which bearing cavity bearings are retained to permit rotation of the wheel bearing hub relative to one of a non driven axle spindle and a drive tube spindle of a driven axle and wherein the bearings are retained in place by a nut and lock washer mounted to either the axle spindle or drive tube spindle, an improvement including an early warning jam nut adapted to be threaded to either the axle spindle or drive tube spindle so as to abut the lock washer, said early warning jam nut having a least one tool receiving socket associated therewith, and a diameter of said early warning jam nut is at least substantially equal to or greater than a diameter of a bore within the bearing cavity in which the bearings are seated.

20. The early warning system of claim 19 wherein said early warning jam nut is formed in a hat-shape having a central domed portion defining in inner threaded cavity and from which extends an annular flange defining an outer peripheral surface, and said at least one tool receiving socket being formed in a central face of said domed portion for receiving a tool that can be used to adjust said early warning jam nut relative to an axle spindle.

21. The early warning system of claim 20 wherein said early warning jam nut includes a plurality of spaced threaded openings that are spaced relative to one another around said annular flange such that at least one of said plurality of spaced threaded openings will align with one of a plurality of openings in the lock washer, and means receivable within said plurality of spaced threaded openings and of a size to extend into an align one of said plurality of openings in said lock washer.

22. The early warning system of claim 19 in which the early warning jam nut is formed as a ring member having inner threads adapted to engage threads of a drive tube spindle, a bar member, means for selectively securing said bar member across said ring member, and said at least one tool receiving socket being formed within said bar member for facilitating adjustment of said early warning jam nut relative to the drive spindle tube.

23. The early warning system of claim 22 wherein said early warning jam nut includes a plurality of spaced threaded openings that are spaced relative to one another around said ring member such that at least one of said plurality of spaced threaded openings will align with one of a plurality of openings in said lock washer, and means receivable within said plurality of spaced threaded openings of a size to extend into an aligned one of said plurality of openings in said lock washer.

\* \* \* \* \*